United States Patent

Grimm et al.

[11] Patent Number: 5,108,147
[45] Date of Patent: Apr. 28, 1992

[54] DEVICE FOR FASTENING A HEADLINER TO THE ROOF FRAME OF A SLIDING OR SLIDING/LIFTING ROOF STRUCTURE

[75] Inventors: Rainer Grimm, Wetzlar; Karl Schmidhuber, Alzenau, both of Fed. Rep. of Germany

[73] Assignee: Rockwell Golde GmbH, Frankfurt, Fed. Rep. of Germany

[21] Appl. No.: 585,107

[22] PCT Filed: Jan. 22, 1990

[86] PCT No.: PCT/DE90/00039
§ 371 Date: Sep. 25, 1990
§ 102(e) Date: Sep. 25, 1990

[87] PCT Pub. No.: WO90/08667
PCT Pub. Date: Aug. 9, 1990

[30] Foreign Application Priority Data

Jan. 26, 1989 [DE] Fed. Rep. of Germany ....... 3902278

[51] Int. Cl.⁵ .................................. B60J 7/00
[52] U.S. Cl. ...................... 296/214; 296/216
[58] Field of Search ............. 296/39.1, 214, 216; 52/506, 511; 24/293, 295, 297

[56] References Cited

U.S. PATENT DOCUMENTS

| 4,671,565 | 6/1987 | Grimm et al. | 296/216 |
| 4,707,022 | 11/1987 | Roos et al. | 296/214 X |
| 4,718,714 | 1/1988 | Tanino et al. | 296/214 |
| 4,733,904 | 3/1988 | Snyder | 296/213 |
| 4,815,194 | 3/1989 | Lievesley | 296/216 |
| 4,923,245 | 5/1990 | Kuwabara | 296/214 |
| 5,002,334 | 3/1991 | Meiler et al. | 296/214 |

FOREIGN PATENT DOCUMENTS

| 3143346 | 5/1983 | Fed. Rep. of Germany | 296/216 |
| 1192068 | 10/1959 | France | 296/214 |
| 603299 | 3/1960 | Italy | 296/214 |
| 0158120 | 9/1982 | Japan | 296/216 |

*Primary Examiner*—Dennis H. Pedder
*Attorney, Agent, or Firm*—Toren, McGeady & Associates

[57] ABSTRACT

A device for fastening a rigid preformed headliner (13) to horizontal flanges (12) of the roof frame (4) of a sliding or sliding/lifting roof construction by means of a clamping section (10). As a result of its special construction and attachment, the clamping section (10) allows a simple installation of the headliner (13) at the roof frame (4) so as not to be visible from the vehicle interior.

6 Claims, 2 Drawing Sheets

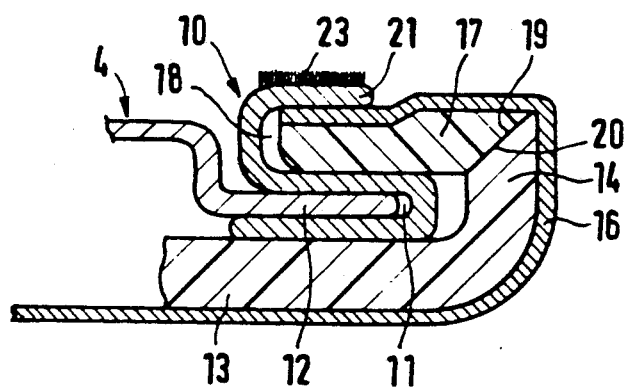
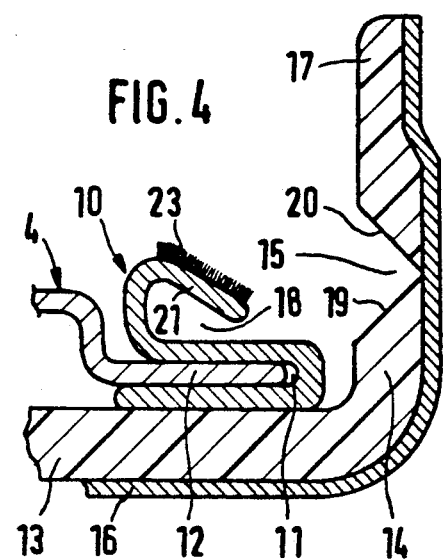
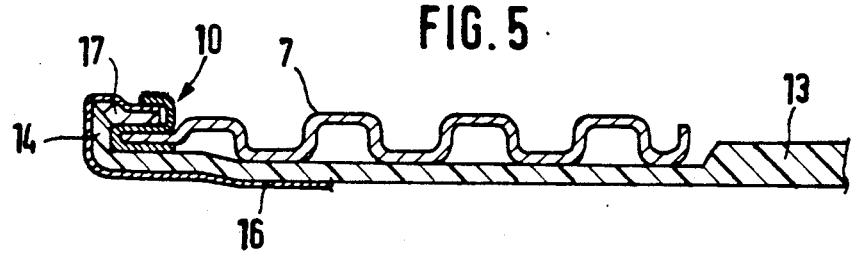
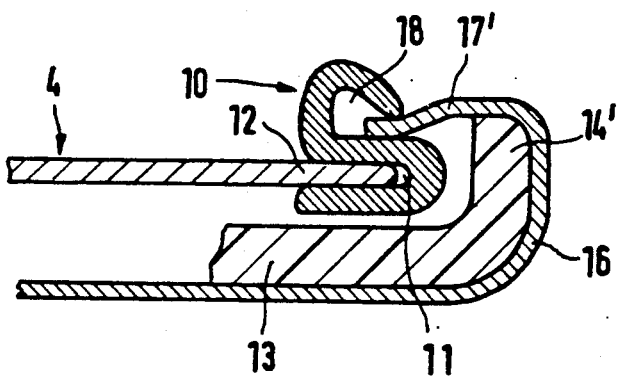

DEVICE FOR FASTENING A HEADLINER TO THE ROOF FRAME OF A SLIDING OR SLIDING/LIFTING ROOF STRUCTURE

The invention is directed to a device for fastening a preformed rigid headliner to horizontal flanges of a roof frame surrounding the roof opening of a sliding or sliding/lifting roof construction by means of a clamping section which receives the edges of the flange and cut out portion in two grooves which are arranged one above the other, wherein the headliner comprises a cut out portion corresponding to the roof opening.

The term "headliner" designates all conventional frame constructions which enclose the roof cut out portion in the fixed vehicle roof and are fastened from below at the fixed vehicle roof. This includes one-piece frames which are molded from sheet metal, frames comprising a plurality of parts, and also frames in which the frame parts are combined with the guide rails of the roof construction to form a one-piece U-shaped guide frame.

In a known cable guide for motor vehicle roofs (DE-C2 32 21 487), a device of the generic type named in the beginning is utilized. The clamping section extending around the cut out portion in the headliner is constructed in the manner of a flexible piping which is placed on the flange of the roof frame as well as on the edge of the cut out portion in the headliner by its two parallel and horizontal grooves, which are arranged one above the other. The headliner is reliably fastened to the horizontal flange of the roof frame with this arrangement, but the clamping section is visible from the interior of the vehicle and therefore makes itself apparent in a disturbing manner. In particular, it is difficult to harmonize the color and/or surface structure of the visible surface of the headliner with that of the clamping section, since they both comprise different plastics materials which can only be matched in a very imperfect way with respect to color. In this way, the roof opening, i.e. the cut out portion in the headliner, is emphasized in a disadvantageous way by the distinct framing effect of the clamping section, which results in a disturbing interruption in the roof view from the interior of the vehicle, which roof view is otherwise uniform and covers a large surface area.

In another known motor vehicle roof (DE-GM 77 09 851), a clamping section which disturbs the roof view is not provided for fastening the rigid preformed headliner at the roof frame; however, the fastening of the headliner in this motor vehicle roof requires a vertical bent edge of the roof frame which is overlapped at its upper edge by a correspondingly upwardly bent edge which is formed on at the headliner, projects into the roof opening, and is arranged at the edge of the headliner cut out portion. But such a vertical bent edge is not present in many roof frames which, on the contrary, end toward the roof opening in horizontal flanges to which the headliner is fastened.

Proceeding from the generic type indicated in the beginning, the invention has the object of providing a device for fastening the headliner at the roof frame which is simple and does not stand out in a disturbing manner in the field of view.

The proposed object is met in that the grooves of the clamping section are open in opposite directions, in that the lower groove receives the edge of the flange and the upper groove receives the edge of the cut out portion, in that the edge of the cut out portion comprises, in a manner known per se (DE-GM 77 09 851), an upwardly directed edge which is formed on at the headliner and projects into the roof opening, and in that the edge of the cut out portion comprises an edge strip which adjoins the upwardly bent edge and is displaced toward the clamping section.

As a result of this arrangement, the clamping section is located outside the area of the vehicle body visible from the vehicle interior. The roof view has the appearance of a uniform surface and is not disturbed by framing effects. The fastening of the headliner at the clamping section is likewise located in the area of the roof construction that is not visible from the vehicle interior. The edge strip of the upwardly bent edge of the headliner which is displaced toward the clamping section effectively contributes to a stiffening of the edge of the headliner in the area of its cut out portion after being fastened in the upper groove of the clamping section.

The clamping section is preferably constructed so as to have an S-shaped cross section and so as to be resilient at least in the area of its upper groove for the clamping support of the edge of the cut out portion. In this way, the clamping section, which may likewise be arranged on the flange of the roof frame so as to be resilient, can securely fasten the edge of the cut out portion of the headliner, which edge is displaced toward the clamping section, by means of its springing behavior in the area of the upper groove without the use of fastening means. A number of suitable work materials are available for the construction of the clamping section. For example, the clamping section can be shaped from a sheet metal, e.g. spring steel. But the clamping section can also be shaped from a thermoplastic plastic, e.g. from an extruded polyamide.

The upwardly bent edge of the edge of the cut out portion in the headliner is preferably provided at its side facing the clamping section with a bending notch which extends parallel to the flange of the roof frame and whose side walls contact one another after the displacement of the edge strip adjoining the bending notch, the edge strip being clamped into the upper groove of the clamping section. In this construction of the device, the construction of the edge strip in combination with the surface-area contact of the side walls of the bending notch results in an advantageously rigid edge area for the cut out portion provided in the headliner.

Alternatively, the device can also be constructed in such a way that the headliner is coated on its visible side with a coating material which projects over the upwardly bent edge with an edge strip which is displaced toward the clamping section and is clamped into the upper groove of the clamping section. In this embodiment form, the arrangement of a bending notch is dispensed with, since only the coating material is guided beyond the upwardly bent edge and takes over the fastening of the headliner at the clamping section attached to the flange of the roof frame. Of course, the rigid preformed headliner can also be coated with a coating material in the embodiment form discussed in the preceding.

Various embodiment examples of the invention are explained in more detail in the following with the aid of the drawings.

FIG. 3 shows an enlarged section detail from FIG. 2;

FIG. 4 shows a broken section corresponding to FIG. 3, but prior to the clamping fastening of the headliner at the clamping section;

FIG. 5 shows a broken section through the roof frame and the fastening position for the headliner along line V—V in FIG. 1; and FIG. 6 shows a section similar to FIG. 3, but in a different embodiment form of the fastening.

Figure 1:
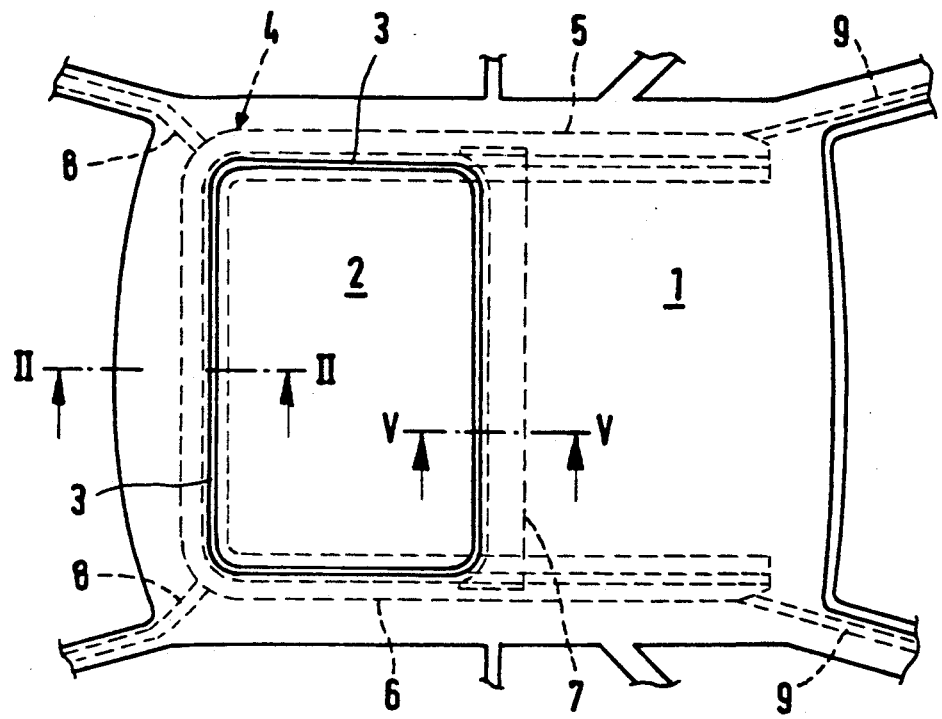
FIG. 1 shows a broken top view of a motor vehicle roof which is constructed as a sliding or sliding/lifting roof.

In the motor vehicle roof shown in FIG. 1, a roof cut out portion, which is not described in more detail and is closable by means of a movable rigid cover 2, is located within a fixed roof surface 1. The cover 2, which can be produced from sheet metal material or from glass or a transparent plastic, is shown in FIG. 1 in the position in which it closes the roof cut out portion. A circumferentially extending edge gap 3 is located between the fixed roof surface 1 and the cover 2. A U-shaped guide frame 4 is fastened below the fixed roof surface 1, its two lateral frame parts 5 and 6 being connected with one another by means of a transverse connector 7 which stiffens the frame and also defines the roof opening at the rear. Two front and two rear water runoffs 8 and 9, respectively, adjoin the water-carrying areas of the guide frame 4. The guide rails arranged at the guide frame 4 and the elements controlling the movements of the cover 2 do not make up a part of the present invention and are therefore neither shown in the drawing nor explained in more detail in the following description.

A first embodiment form of the device is described with reference to FIGS. 2 to 5. As follows from the latter, an S-shaped clamping section 10 is attached to the horizontal flange 12 of the guide frame 4 by means of its lower groove 11, wherein a clamping action can be achieved in that the groove width at the input of the lower groove 11 is constructed so as to be smaller than the thickness of the flange 12. This results in a clamping fit of the clamping section 10 on the flange 12.

As illustrated in FIG. 4, a rigid headliner 13, which is preformed from a suitable plastic, is advanced from below until contacting the clamping section 10 at the guide frame 4, wherein an upwardly directed bent edge 14 which is formed on at the headliner 13 projects into the roof opening defined by the guide frame 4. A bending notch 15, which is guided in the shown example through the material thickness of the headliner 13 up to a coating material 16 connected with the latter, is located in the upwardly bent edge 14 at its side facing the clamping section 10 so as to extend parallel to the flange 12. The coating material 16 therefore forms a hinge-like connection at the bending notch 15 between the upwardly bent edge 14 and the upper edge strip 17 adjoining the bending notch 15. In this embodiment example, the edge strip 17 also comprises the relatively thick plastics material of the headliner 13 and the coating material 16 connected with the latter.

Figure 2:
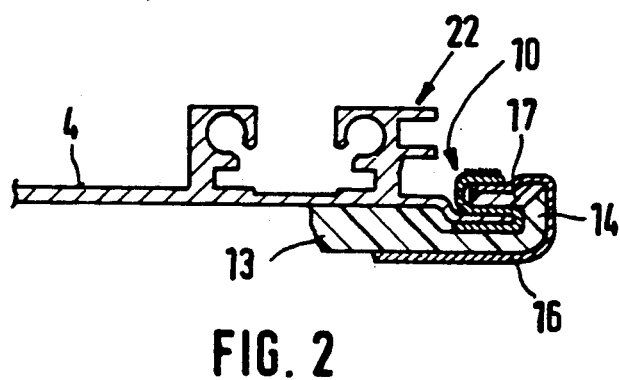
FIG. 2 shows a broken section through the roof frame and the fastening position of the headliner along line II—II in FIG. 1.

In order to fasten the headliner 13 at the guide frame 4, the edge strip 17 is displaced toward the clamping section 10 and inserted into its resiliently bent upper groove 18 until reaching the position of the parts shown in FIGS. 2, 3 and 5. The side walls 19 and 20 of the bending notch 15, which define the upwardly bent edge 14 at the top and the edge strip 17 at the bottom, contact one another along their planar surface and are held by means of the clamping section 10 in this position which stiffens the edge area of the headliner, the edge strip 17 being clamped in the upper groove 18 of the clamping section 10. The springing effect of the upper groove 18 is achieved by means of a bending of the upper flange 21 of the clamping section 10, which is shown in a FIG. 4 in an exaggerated manner. In order to be able to displace the edge strip 17 at all four sides of the roof opening toward the clamping section 10, corresponding recesses (not shown) must naturally be provided in the edge strip 17 at the corners of the headliner cut out portion, which recesses are guided from the upper edge of the edge strip 17 to the bending notch 15.

The clamping section 10, which is shaped from a suitable sheet metal or from a thermoplastic plastic material, can be provided in a continuous manner at all four sides of the guide frame 4. However, it can also be sufficient for a plurality of shorter portions of the clamping section 10 to be arranged so as to be distributed along the side lengths.

The guide rail 22, which is integrated with the guide frame 4 in this embodiment example, can be seen in FIG. 2. FIG. 5 shows the corresponding fastening position at the transverse connector 7. In the shown example of FIGS. 2 to 5, a brush nap layer 23 intended for sliding support of the headliner (not shown) is located on the upper flange 21 of the clamping section 10.

The embodiment example shown in FIG. 6 differs from the embodiment example described in the preceding substantially in that no bending notch or edge strip formed from the material of the headliner 13 is connected to the upwardly bent edge 14'. The edge strip 17' is formed in this case by the coating material 16 which projects over the upwardly bent edge 14'. The upwardly bent edge 14' is rounded off at its upper inner edge so that the edge strip 17', which is displaced toward the clamping section 10, has a corresponding rounded off portion at this inner edge. In addition, the edge strip 17' is inserted into the upper groove 18 of the clamping section 10 in a similar manner and is securely held in the latter by means of a clamping action, as has been described with reference to the preceding embodiment example. The clamping section 10 in the embodiment example according to FIG. 6 likewise comprises an S-shaped cross section which, however, is constructed differently from the clamping section corresponding to the embodiment example according to FIGS. 2 to 5. The clamping section 10 according to FIG. 6 is particularly suitable for production from a thermoplastic plastic, e.g. a polyamide, with respect to its shaping.

We claim:

1. Device for fastening a preformed rigid headliner to horizontal flanges of a roof frame surrounding a motor vehicle roof opening of a sliding or sliding/lifting roof construction by means of a clamping section which receives edges of the roof frame flanges and of a headliner cut out portion in two grooves arranged one above the other, wherein the headliner comprises a cut out portion corresponding to the roof opening, wherein the two grooves (11, 18) of the clamping section (10) are open in oppositely facing directions, the two grooves comprise a lower groove and an upper groove and the lower groove (11) receives the edge of one of the flanges (12) and the upper groove (18) receives the edge of the cut out portion, the edge of the cut out portion comprises an upwardly directed bent edge (14; 14') which is formed on the headliner (13) and projects into the roof opening and the bent edge (14; 14') of the cut out portion comprises an edge strip (17; 17') projecting from the upwardly bent edge (14; 14') and forming the edge of the cut out portion received in the upper groove (18), and the clamping section is resilient at least in the region of the upper groove for effecting a resilient clamping engagement with the edge strip (17, 17').

2. Device according to claim 1, wherein the clamping section (10) is S-shaped in transverse section.

3. Device according to claim 1 or 2, characterized in that the clamping section (10) is shaped from sheet metal.

4. Device according to claim 1 or 2, characterized in that the clamping section (10) is shaped from a thermoplastic plastic.

5. Device according to one of claims 1 or 2, wherein the upwardly bent edge (14) of the edge of the cut out portion in the headliner (13) is provided in a surface thereof facing the clamping section (10) with a bending notch (15) extending parallel to one of the flanges (12) of the roof frame (4), side walls (19, 20) of the bending notch (15) contact one another after the displacement of the edge strip (17) adjoining the bending notch (15) into clamped engagement in the upper groove (18) of the clamping section (10).

6. Device according to one of claims 1 or 2 wherein the headliner (13) is coated on a visible side with a coating material (16) extending over the upwardly bent edge (14') and forms the edge strip (17') clamped in the upper groove (18) of the clamping section.

* * * * *